(12) United States Patent
Del Gallo et al.

(10) Patent No.: US 6,180,146 B1
(45) Date of Patent: Jan. 30, 2001

(54) PROCESS FOR REDUCING THE OXIDATION OF FOOD PRODUCTS BY ELECTROCHEMICAL EXTRACTION OF OXYGEN

(75) Inventors: Pascal Del Gallo, Gif sur Yvette; Gilles LaGrange, Forges les Bains; Lucie Prost, Viroflay, all of (FR)

(73) Assignee: L'Air Liquide, Societe Anonyme pour l'Etude et l'Exploitation des Procedes Georges Claude, Paris (FR)

(*) Notice: Under 35 U.S.C. 154(b), the term of this patent shall be extended for 0 days.

(21) Appl. No.: 09/347,021

(22) Filed: Jul. 2, 1999

(30) Foreign Application Priority Data

Jul. 3, 1998 (FR) .................................................. 98 08523

(51) Int. Cl.$^7$ ............................ A23D 9/06; A23L 3/3418
(52) U.S. Cl. ...................... 426/321; 426/330.6; 426/330; 426/417; 426/422; 426/486; 205/687
(58) Field of Search .................................... 426/321, 330, 426/330.6, 417, 422, 442, 478, 486; 205/687

(56) References Cited

U.S. PATENT DOCUMENTS

| | | | |
|---|---|---|---|
| 3,400,054 | * 9/1968 | Ruka et al. ................................. 204/1 |
| 3,963,597 | 6/1976 | Kleitz et al. ........................... 204/277 |
| 4,125,482 | * 11/1978 | Sinha .................................... 252/447 |
| 4,151,060 | 4/1979 | Isenberg .............................. 204/195 S |
| 4,212,891 | 7/1980 | Fujita et al. .......................... 426/231 |
| 4,330,633 | 5/1982 | Yoshisato et al. .................... 501/152 |
| 4,967,295 | 10/1990 | Yamauchi et al. ................. 360/97.02 |
| 5,008,122 | * 4/1991 | Rosnack et al. ...................... 426/417 |
| 5,068,115 | * 11/1991 | Liebermann ................... 426/330.6 X |
| 5,227,257 | * 7/1993 | Abraham et al. ....................... 429/80 |
| 5,298,271 | * 3/1994 | Takashina et al. ................ 426/471 X |
| 5,348,755 | * 9/1994 | Roy ....................................... 426/541 |
| 5,385,874 | 1/1995 | Renlund et al. ...................... 501/103 |
| 5,573,655 | * 11/1996 | Mairesse et al. ..................... 205/634 |
| 5,582,710 | * 12/1996 | Mairesse et al. ................ 205/687 X |
| 5,785,839 | * 7/1998 | Kleitz et al. ..................... 205/687 X |

FOREIGN PATENT DOCUMENTS

| | | |
|---|---|---|
| 0428 414 A1 | 11/1990 | (EP) . |
| 0580896 | * 2/1994 | (EP) . |
| 2698 016 A1 | 11/1992 | (FR) . |
| WO91/01274 | 7/1990 | (WO) . |
| WO94/06544 | 9/1993 | (WO) . |
| 94/06545 | * 3/1994 | (WO) . |
| WO95/31093 | 5/1995 | (WO) . |
| 95/27401 | * 10/1995 | (WO) . |

OTHER PUBLICATIONS

Patent Abstracts of Japan, vol. 017, No. 200 (C–1050), Apr. 20, 1993 & JP 04 346774 A (Hitachi Ltd), Dec. 2, 1992.
Search Report issued in French Application No. FR 98 08523.

* cited by examiner

*Primary Examiner*—Milton Cano
(74) *Attorney, Agent, or Firm*—Burns, Doane, Swecker & Mathis, L.L.P.

(57) ABSTRACT

A process is provided for treating food products in order to reduce or eliminate the detrimental effects of the presence of oxygen in the atmosphere which is in contact with the products and, more particularly, the external surface of the products. A non-zero quantity of oxygen is extracted from the atmosphere by implementing a solid electrolyte which is an $O^{2-}$ ion conductor and is essentially impermeable to the gases. The invention has applicability to preserving frying oil baths.

10 Claims, 3 Drawing Sheets

Figure 1:
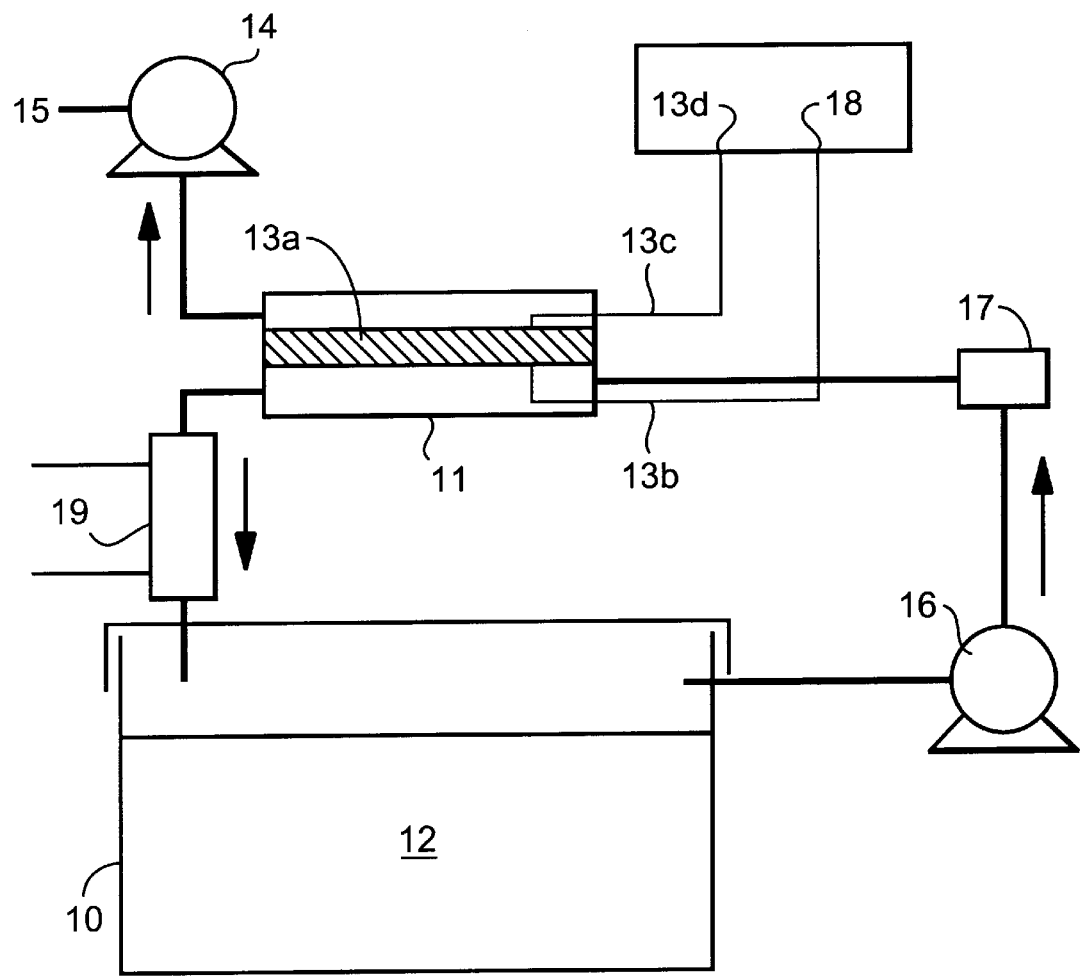

PROCESS FOR REDUCING THE OXIDATION OF FOOD PRODUCTS BY ELECTROCHEMICAL EXTRACTION OF OXYGEN

BACKGROUND OF THE INVENTION (i). Field of the Invention

The present invention relates to a process for reducing the oxidation of food products.

(ii). Description of Related Art

When they are being manufactured, prepared or used, food products are liable to be exposed to ambient air, which may lead to oxidation of some of their components, degradation of their quality and shortening of their life. In particular, cooking oils which consist principally of fatty acid esters and glycerine, it being possible for the said esters to contain unsaturations on their hydrocarbon chain, in the course of time undergo reactions catalysed by light and heat, such as hydrolysis and oxidation, which lead to the breakdown of the said esters into fatty acids, into fatty acid peroxides and into other breakdown products; the effect which this has is to lower the smoke point of the oil baths, their coloration, and reduce their quality, and these themselves affect the taste qualities of the food cooked in them.

In order to prevent the degradation of food products or oils during their storage, transport or use, gas-based inerting of them using nitrogen is currently employed. The American patent published under U.S. Pat. No. 5,298,271 describes a method of storing and transporting large quantities of palm oil consisting in permanently maintaining an oxygen-depleted atmosphere, that is to say an atmosphere enriched with nitrogen with a concentration in excess of 99.5%, above the oil baths, both after refining, during storage, during transfer to transport units and during transport. The formation of fatty acids, peroxides and other breakdown products is then greatly reduced. The authors have shown that the method is effective only if the maximum oxygen level in the atmosphere above the baths is less than or equal to 1% by volume; otherwise, there is a strong increase in the proportion of fatty acids and the proportion of peroxides. However, this method, as well as the one described in the European patent application published under number EP 0580896, are not satisfactory when small-scale applications are involved, such as the purification of a small volume of gas above a food bath of a few litres, principally because of the constraints connected with the scale of these methods.

Another solution consists in inerting not only the atmosphere above the food baths, but also in injecting nitrogen into the bath, irrespective of whether the latter is in operation or off. The process described in the international patent application published under number WO 95/27401 consists in injecting, using small injection nozzles with a diameter of the order of 5 $\mu$m, nitrogen in divided form into the industrial frying bath containing about 1.5 to 5 m$^3$ of oil. Analyses of these baths show that with inerting under nitrogen, whether in operation at 180° C., at a nitrogen flow rate of 5 to 10 m$^3$/hour or when off at room temperature, at a flow rate of 2 m$^3$/hour, the proportions of free fatty acids and of peroxides are much lower. Currently, the system most frequently employed is partial inerting of the vats by flushing.

Other methods described in the literature employ the absorption technique by circulating the liquid to be preserved through a filtration module containing various kinds of absorbents. These absorbents may contain antioxidants impregnated on various supports; the use of active carbons covered with antioxidants is described in the American patent published under U.S. Pat. No. 5,348,755; the use of magnesium oxide impregnated on active carbon is described in the American patent published under U.S. Pat. No. 4,125,482; the use of aqueous solutions containing EDTA, ethylenediaminetetraacetic acid, is described in the American patent published under U.S. Pat. No. 4,968,518; the use of solutions of citric and ascorbic acids is described in the American patent published under U.S. Pat. No. 5,068,115. A process involving settling may also be cited, which is described in the American patent published under U.S. Pat. No. 5,008,122 and consists in mixing the frying oils and solvents having different specific gravities. The mixture formed is then separated by gravity, one of the flows, containing the solvent and the impurities, is discarded while the other, consisting of clean oil, is returned to the frying vat.

In general, all the processes described above are appropriate only for large volumes of food products, for example more than a cubic metre, and are difficult to adapt to small installations such as oil baths in fast-food establishments. This is because they require, in particular, the installation of gas injectors and hoods, the creation of a perfect seal of the vat/hood system, the fitting of gas lines, and systems for controlling the gas flow rates, and generate problems involving storage of the cylinders.

The Applicant Company has therefore tried to develop a process and a device which make it possible to minimize the oxidation of food products while being simple to employ and suitable for small installations, such as those in restaurants.

SUMMARY AND OBJECTS OF THE INVENTION

The invention relates to a process for treating food products in order to reduce or eliminate the detrimental effects of the presence of oxygen in the atmosphere which is in contact with the external surface of the said products, characterized in that a non-zero quantity of oxygen is extracted from the said atmosphere by implementing a solid electrolyte which is an $O^{2-}$ ion conductor and is essentially impermeable to the gases. The process as defined above is, in particular, employed in the preservation of edible-oil baths and, more particularly, frying-oil baths.

DETAILED DESCRIPTION OF PREFERRED EMBODIMENTS OF THE INVENTION

In the process as described above, the solid electrolyte is operated according to a purely electrochemical mechanism, generated by a current generator or according to an electrochemical semi-permeability process, generated by the oxygen partial pressure difference between each of the faces of the said electrolyte. In the case of a purely electrochemical mechanism, the solid electrolyte is in contact with two electrodes, respectively an anode and a cathode which are porous to the gases and are themselves connected to a current generator.

According to a first variant of the process as defined above, the solid electrolyte comprises at least one doped ceramic oxide. The doped ceramic oxide is for example selected from zirconia ($ZrO_2$), thoria ($ThO_2$), cerium oxide ($CeO_2$), hafnium oxide ($HfO_2$) and bismuth oxide ($Bi_2O_3$), doped with one or more oxides selected from magnesium oxide (MgO), yttrium oxide ($Y_2O_3$), calcium oxide (CaO), lanthanum oxide ($La_2O_3$), ytterbium oxide ($Yb_2O_3$), strontium oxide (SrO), scandium oxide ($Sc_2O_3$) and barium oxide (BaO) and, preferably, $ZrO_2$ stabilized with $Y_2O_3$ (YSZ), $ZrO_2$ stabilized with CaO, $ZrO_2$ stabilized with $Sc_2O_3$, $Bi_2O_3$ stabilized with $Y_2O_3$ (BY), $CeO_2$ stabilized with $Y_2O_3$, $CeO_2$ stabilized with CaO and $ThO_2$ stabilized with $Y_2O_3$. Ceramic oxides doped with two oxides, such as those described in the American patent published under U.S. Pat. No. 5,385,874, may also be involved.

According to a second variant of the process to which the present invention relates, the solid electrolyte comprises at least one compound selected from the derivatives of $Bi_4V_2O_{11}$, as they are described in the international patent application published under number WO 91/01274 and known by the generic name BIMEVOX. These derivatives, in which a variable fraction of the vanadium is replaced by a metal selected, in particular, from the alkaline earth metals, the transition metals, the rare earths or the elements in groups III to V of the periodic table, conduct by $O^{2-}$ ions and their anionic conductivity at 500° C. is of the same order of magnitude as that, at 800° C., of the stabilized zirconias. The partial substitution of the constituted elements of $Bi_4V_2O_{11}$ stabilizes the structural type of the gamma phase and maintains, in the $O^{2-}$ ion lattice, a proportion of vacancies sufficient to permit the anionic conductivity. The oxygen atoms which are in the $Bi_{2-x}M_yO_2$ layers and are strongly bound to the bismuth atoms cannot move, and the conductivity involved is therefore essentially two-dimensional conductivity; the anionic conductivity of this phase is remarkable, since it reaches $10^{-3}$ $\Omega^{-1}$ $cm^{-1}$ towards 200° C. These BIMEVOXs are employed alone or as a mixture with sintering agents that are chemically inert with respect to the said BIMEVOXs, in electrochemical cells such as those described in the international patent applications published under numbers WO 94/06544 and WO 94/06545, and in cells operating by electrochemical semi-permeability, such as those described in the French patent application published under number FR 2698016.

The term at least one compound of the BIMEVOX family means that a single or a mixture of the said compounds may be involved. The generic term BIMEVOX denotes oxides which are derivatives of $Bi_4V_2O_{11}$ in which a variable fraction of the vanadium is replaced by a metal and, in particular, compounds of formula (I):

$$(Bi_{2-x}M_xO_2)(V_{1-y}M'_yO_2) \qquad (I)$$

in which:

M represents one or more metals substituting for bismuth, which is or are selected from those having an oxidation number less than or equal to 3, and M' represents one or more elements substituting for vanadium which is or are selected from those having an oxidation number less than, equal to or greater than 5, the limiting values of x, y and therefore z being functions of the nature of the substitute elements M and M'.

Among the compounds of formula (I) as defined above, those may be cited in which only the vanadium atom is partially substituted by one or more elements. These compounds then correspond to the formula (II):

$$(Bi_2O_2)(V_{1-y}M'_yO_2) \qquad (II)$$

in which M' is as defined above, y being non-zero and is more particularly greater than or equal to approximately 0.05 and less than or equal to 0.5.

M' is advantageously selected from the alkali metals, the alkaline earth metals, the transition metals, the elements from groups III to V of the periodic table or from the rare earths. When M' represents a transition metal, it is more particularly selected from the atoms of zinc, copper, manganese, nickel, cobalt, iron or cadmium. When M' represents an alkaline earth metal, it is more particularly selected from the atoms of calcium, strontium or barium. As a metal having a degree of oxidation equal to 3, M' may also represent an atom of indium, aluminium or antimony. As a metal having a degree of oxidation equal to 4, M' may also represent an atom of tin, titanium or ruthenium. As a metal having a degree of oxidation equal to 5, M' may also represent an atom of niobium, tantalum or phosphorus. M' may also represent an atom of alkali metal such as sodium or, as a metal having a degree of oxidation equal to 2, represent an atom of Pb. Among the compounds of formula (I) as defined above, those may be cited in which only the bismuth atom is substituted partially by one or more metals. These derivatives then correspond to the formula (III):

$$(Bi_{2-x}M_xO_2)(VO_2) \qquad (III)$$

in which x is non-zero and M is as defined above and is, more particularly, selected from the rare earths such as lanthanum.

Among the compounds of formula (I), those may furthermore be cited in which the oxygen atom is partially substituted by fluorine, or even those containing mixed substitutions of bismuth and vanadium and corresponding to formula (I) above in which x and y are non-zero and, more particularly, of the compounds of formula (IV):

$$(Bi_{2-x}Pb_xO_2)(V_{1-y}Mo_yO_2) \qquad (IV)$$

In the process to which the present invention relates, the solid electrolyte consisting of one or more BIMEVOX derivatives is either in contact with two so-called bulk electrodes, respectively an anode and a cathode which are porous to the gases, or in itself constitutes a uniform structure consisting of one or more BIMEVOX solid electrolyte derivatives with dynamic electrodes which are created "in situ", are reversible and are self-adaptive.

In the definition above, the term uniform structure means that, unlike the devices in the prior art such as the bulk-electrode cell cited above which consists of a solid electrolyte and two electrodes connected to current collectors, the said electrodes being physically distinguishable from the said electrolyte, the uniform structure is a core of one or more BIMEVOXs behaving both as an electrolyte and as electrodes. In the definition above, the person skilled in the art will readily appreciate the difference which there is between a current collector, whose function is solely to allow the electric current to flow by supplying the electrons to the cathode and by taking them from the anode, and an electrode, whose function is to catalyse the electrochemical dissociation.

In the definition above, the term dynamic electrodes which are created "in situ" means that the electronic conductivity is due to the conversion:

$$\text{vanadium}^V \rightarrow \text{vanadium}^{IV}$$

on the cathode side.

In the definition above, the term which are created "in situ" means that the uniform structure becomes an electrode/electrolyte/electrode structure only by the application of a non-zero potential difference to the opposite faces of the said device, and in the description below reference will be made to "electrode zones" and "electrolyte zone" in the said structure.

In the definition above, the term reversible means that the device can operate in one direction or in the other by simple polarity inversion of the current generator.

The term self-adaptive means that the device can adapt by itself to the two types of functions cited above, namely: the dynamic function and the reversibility function.

The person skilled in the art will also appreciate that one of the advantages of the uniform structure employed by the process to which the present invention relates is that the thickness of the "electrode zones" and of the "electrolyte zone" in the said structure varies, in particular, as a function of the temperature and the strength of the electric current which are applied to it, and that this dynamic nature thus makes it possible to control the rate of extraction of the oxygen. Thus, the more the strength of the applied current increases at constant temperature, the more the thickness of the "electrolyte" zone decreases for an increasing oxygen extraction rate.

When the cell as described above operates by electrochemistry, it is fitted in an electric-current supply circuit for creating a potential difference between its opposite faces, by means of current collectors. These current collectors, which both supply the electrons to the cathode and remove them from the anode, naturally need to be made of a metal, or of a metal alloy, compatible with the BIMEVOXs, such as for example gold, silver, platinum, palladium, copper or stainless steel. The shape of the current collectors is determined so as to optimize the supply of the electrons to the cathode and their removal from the anode. This generally involves a grid, a coating or a tip; if necessary, a non-zero portion of each of the current collectors of the electrochemical cell which is employed lies inside the electrode layer or, where appropriate, the uniform structure; when the collector is a grid, it preferably has several tens of nodes/cm$^2$.

The electrochemical cell which is employed is, in particular, a plane structure with parallel faces or a hollow cylindrical structure with circular or oval cross section, having two coaxial cylindrical faces. An elementary electrochemical cell with bulk electrodes can be represented by scheme (A):

CC'/BIMEVOX'-EC'/BIMEVQX solid electrolyte/ BIMEVOX"-EC"/CC" (A)

in which CC' and CC" represent the anodic and cathodic current collectors, BIMEVOX'-EC' and BIMEVOX"-EC" represent the two characteristic constituents of the bulk electrodes in variable proportions, that is to say on the one hand a BIMEVOX and/or on the other hand an electronic conductor (EC), in particular a metal or a metal oxide. This metal or the metal of the metal oxide may be different from or the same as the metals of the BIMEVOXs. Similarly, the metals ME' and ME" of BIMEVOX' and BIMEVOX" may be the same as or different from that or those contained in the BIMEVOX solid electrolyte. The proportions by weight vary, for example, from 0 to 100% in one of the constituents of the bulk electrode and from 100 to 0% in the other (not including other chemical compounds which may also be present in the bulk electrodes). An elementary electrochemical cell with dynamic electrodes which are created "in situ", are reversible and are self-adaptive can be represented by scheme (B):

CC/(BIMEVOX'/BIMEVOX SOLID ELECTROLYTE/ BIMEVOX"/CC (B)

in which BIMEVOX ELECTROLYTE represents the "electrolyte zone", solid and impermeable to the gases, CC represents the current collectors, BIMEVOX' and BIMEVOX" represent the two characteristic constituents of the "electrode zones". It is possible for the metals ME' and ME" of BIMEVOX' and BIMEVOX" to be the same as or different from that or those contained in the BIMEVOX solid electrolyte.

According to a particular variant of the present invention, the BIMEVOX compound is:

$Bi_2Co_{0.1}V_{0.9}O_{5.35}$.

The process to which the present invention relates makes it possible to obtain in proximity to the surface of the food products, such as oil baths, oxygen levels of the order of 1% by volume instead of the 21% corresponding to the normal level of oxygen in atmospheric air.

FIG. 1 schematically represents the general principle of the device for implementing the process of the invention.

This device comprises a vat 10 containing food products 12. The free surface of these food products is in contact with the atmospheric air. A solid electrolyte membrane 13a is arranged in proximity to the free surface. Each face of the membrane is connected to electrodes 13b, 13c, themselves connected to a generator 13d. The oxygen extracted, by the electrochemical cell, from the atmospheric air present above the food products is discharged via a pump 14 in a pipe 15. The membrane is arranged in a heating source 11 for making it operate at the desired working temperature. The atmosphere to be treated is circulated by a pump 16. An oxygen analyser 17 is placed in the device so as to measure the level of oxygen present in the gas atmosphere above the food products. The system is controlled (temperature, voltage) by an automatic control unit which will control the system 18 as a function of the performance required of the cell. If the temperature of the gas flow of oxygen-depleted atmosphere returning to above the food products is too high, the installation of a cooler 19 in the system may be envisaged.

Figure 2:
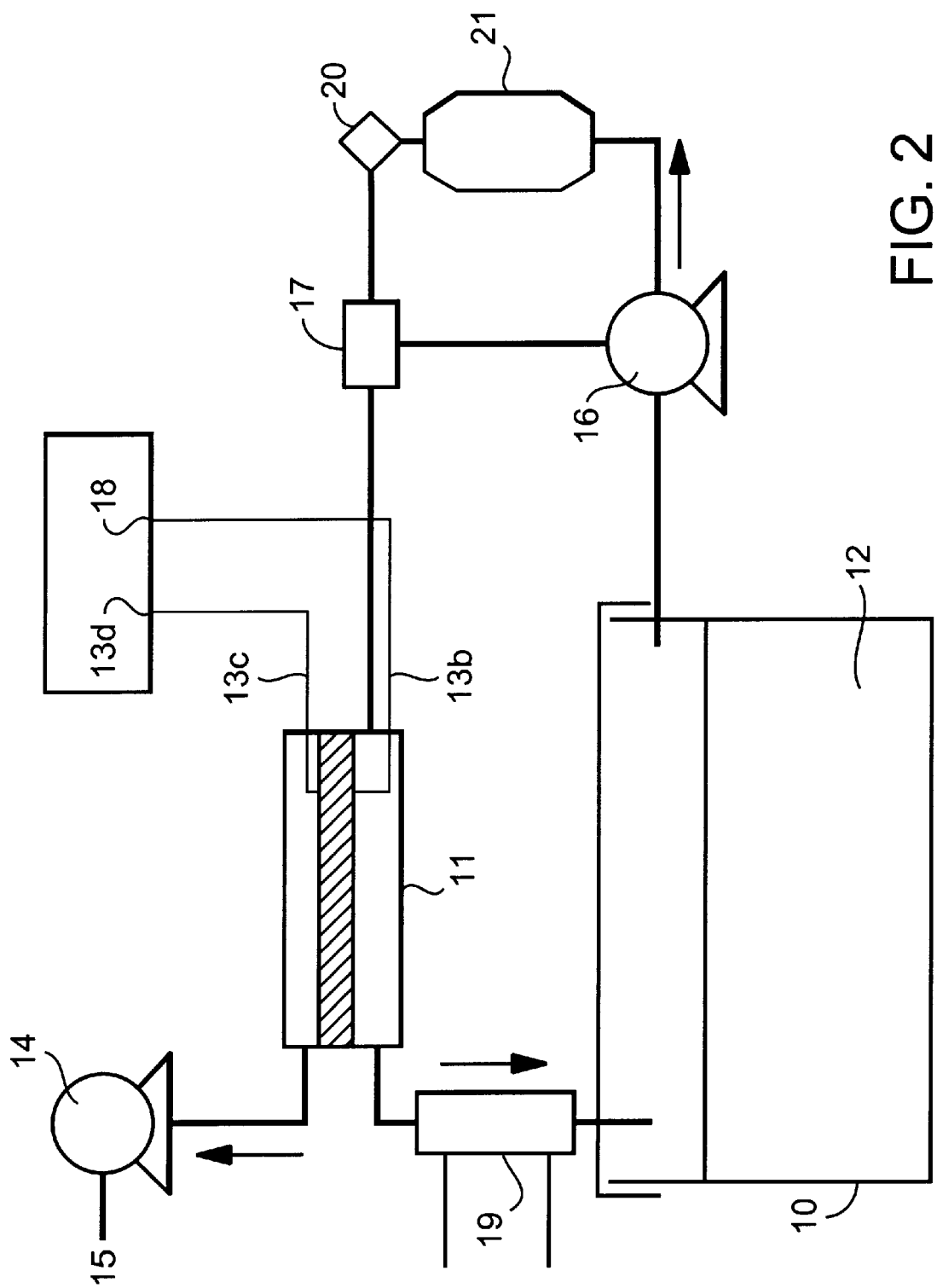

FIG. 2 represents the device from FIG. 1 in which the filtration 20 and absorption 21 means are placed in proximity to the electrochemical cell; the function of these latter two means being to protect the cell from grease and impurities originating from the food products.

The device as described above can operate with the food products being either at room temperature or, in particular in the case of frying oil baths, at the operating temperature i.e. approximately 180° C.

Figure 3:
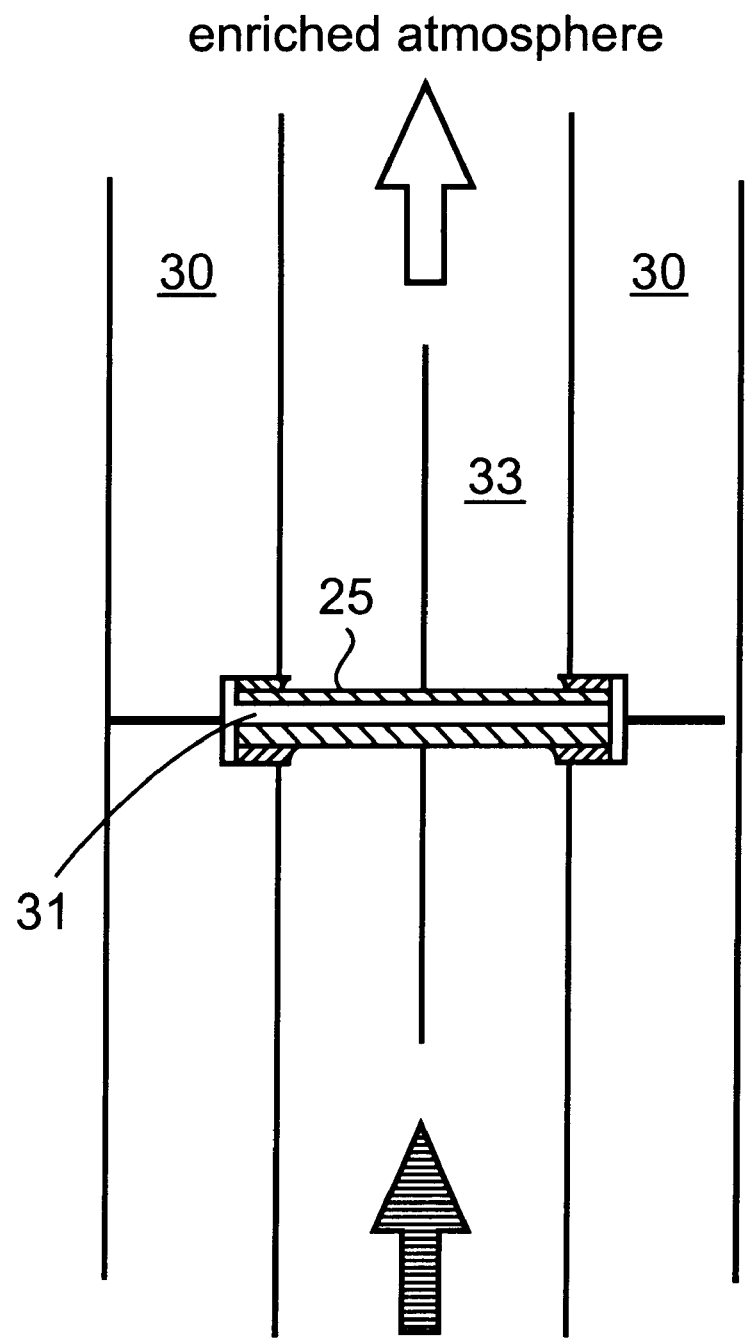

FIG. 3 represents the core of the process, namely the electrochemical cell positioned inside the device for operating the system. The cell is as presented in FIGS. 1 or 2. It consists of solid electrolytes as defined above; the cell (25) is included in a heating compartment (30) capable of producing temperatures up to 750° C. or more. Preferably, the working temperature range will lie between 300 and 600° C. This electrochemical cell consists either of a solid electrolyte based on BIMEVOX (31) and two bulk electrodes, or of a uniform structure consisting of one or more BIMEVOX derivatives with dynamic electrodes which are created "in situ", are reversible and are self-adaptive and of at least two current collectors (33). The solid electrolyte, having ionic conductivity above 250° C., is heated to a working temperature of between 300 and 600° C. and is switched on. A source working either at constant voltage or at constant current is used. The working current densities of the cell are between 10 and 2000 mA/cm$^{-2}$ for voltages between 0.1 and 20 V. The operating conditions comprise voltages lying between 0.5 and 10 V. Under these working conditions, the solid electrolyte makes it possible to extract quantities of oxygen from the atmospheric air of between 25 and 1000 cm$^3$.h$^{-1}$ (cell with approximately 2 cm$^2$ surface area) . It is thus possible to deplete by a factor of 10 the oxygen level of the atmosphere in proximity to the surface of a food product to the extent of rapidly reducing its level to less than 2% by volume. The risk of oxidation of the food products, in particular edible oils, is thus greatly reduced. The surface area of membrane to be developed will be a direct function of the volume of gas atmospheres to be treated. In the case of a volume of around ten litres (2 l of pure oxygen), the use of BIMEVOX cells with a the surface area of between 2 and 25 cm$^2$ to be envisaged. The way in which it is positioned relative to the surface of the bath will be a function of whether or not use is made of a device for pumping the atmosphere to be treated. In view of the operating temperature (250–500° C.), it is not desirable for the membrane to be in proximity to the surface of the food products. However, its use close to the surface of the baths is envisagable so long as a system of protective filters protects the surface of the cell. The example relates to the elimination of any trace of oxygen down to a residual level of the order of 1% from gas atmospheres such as air present above food products, whether liquid or solid, and more particularly frying baths; in this particular case, by installing a small purifier. The latter operates using a ceramic membrane with solid electrolyte. One litre of palm oil was introduced into a vat. The system was at room temperature and was subjected to vigorous stirring in order to simulate maximal oxidation conditions. The volume of air above the oil baths was approximately one litre. A solid electrolyte membrane was arranged above the surface of the oil bath. The materials used were $BiCu_{0.1}V_{0.9}O_{5.35}$ and $BiCo_{0.1}V_{0.9}O_{5.35}$. The materials were shaped into a pellet by uniaxial compression. The thicknesses were between 1 and 5 mm, the diameters between 10 and 20 mm, and the densities obtained were between 85 and 95%. The current collection was carried out using a gold grid with controlled lattice structure. The cell was arranged inside a furnace according to the description of FIG. 3 and was connected to an electrical circuit (current or voltage generator). The membrane was heated to 580° C. and was powered up. During the initial moments, the contribution required of the cell is a maximum (high voltage, high current density) so as to make the oxygen level fall rapidly from 21% by volume to 1–2%. The volume of oxygen to be extracted being about 210 cm$^3$, the $BiCo_{0.1}V_{0.9}O_{5.35}$ cell could operate for example at 6 V–1.2 A ($O_2$ volume extracted: 280 cm$^3$.h$^{-1}$) for about 40 minutes. When this level was reached, the control system reduced the applied potential so as to maintain the system in order to counteract the possible intake of air connected with the sealing of the system. The operating values reached were then typically 1 V–0.3 A.

Two frying baths A and B (2.5 l capacity) filled with the same oil were operated at the oil's working temperature, i.e. 180° C. The oils were kept at 180° C. for 5 h per day over three days; between the periods of use, the oils were cooled as indicated below. Four frying operations per day were carried out under identical conditions for baths A and B, that is to say by introducing 180 g of chips during each fry and by carrying out identical cooking. After five hours of heating to 180° C., the baths were cooled in the fryers to 90° C. then transferred to glass reactors. Reference bath A was stored in the reactor with no special precaution, that is to say with no leak-tight lid or inerting. Bath B was subjected to the process to which the invention relates. The results of the analyses, the peroxide index and the acidity of the oil, are reported in the table below:

| Acidity level (% oleic acid) | bath A | bath B |
|---|---|---|
| t = 0 | 0.04 | 0.04 |
| t = 1d | 0.09 | 0.09 |
| t = 2d | 0.18 | 0.17 |
| t = 3d | 0.28 | 0.24 |
| peroxide index (mmEq/kg) | ref. bath A | bath B (meq/kg) |
| t = 0 | 0.30 | 0.30 |
| t = 1d | 7.3 | 6.2 |
| t = 2d | 11.5 | 9.9 |
| t = 3d | 9.6 | 9.1 |

The results obtained demonstrate that implementing the process to which the present invention relates makes it possible to slow the formation of peroxides and fatty acids and, consequently, to extend the period of time for which frying baths can be used while maintaining their quality.

What is claimed is:

1. A process for treating food products in order to reduce or eliminate the detrimental effects of the presence of oxygen in an oxygen containing gas atmosphere which is in contact with external surface of the products, comprising extracting a non-zero quantity of oxygen from the atmosphere by implementing a solid electrolyte which is an $O^{2-}$ ion conductor and is substantially impermeable to the gases.

2. The process according to claim 1, wherein the food product is an edible-oil, and the process extends the length of time for which a bath of the edible-oil can be used.

3. The process according to claim 2, wherein the edible-oil is a frying-oil.

4. The process according to claim 1, wherein the oxygen is extracted by an electrochemical mechanism or by electrochemical semi-permeability.

5. The process according to claim 1, wherein the solid electrolyte comprises at least one doped ceramic oxide.

6. The process according to claim 5, wherein the doped ceramic oxide is selected from the group consisting of zirconia ($ZrO_2$), thoria ($ThO_2$), cerium oxide ($CeO_2$), hafnium oxide $HfO_2$) and bismuth oxide ($Bi_2O_3$), doped with one more oxides selected from the group consisting of magnesium oxide (MgO), yttrium oxide ($Y_2O_3$), calcium oxide (CaO), lanthanum oxide ($La_2O_3$), ytterbium oxide ($Yb_2O_3$), strontium oxide (SrO), scandium oxide ($Sc_2O_3$) and barium oxide (BaO).

7. The process according to claim 6, wherein the doped ceramic oxide is selected from the group consisting of $ZrO_2$ stabilized with $Y_2O_3$ (YSZ), $ZrO_2$ stabilized with CaO, $ZrO_2$ stabilized with $Sc_2O_3$, $Bi_2O_3$ stabilized with $Y_2O_3$ (BY), $CeO_2$ stabilized with $Y_2O_3$, $CeO_2$ stabilized with CaO and $ThO_2$ stabilized with $Y_2O_3$.

8. The process according to claim 1, wherein the solid electrolyte comprises at least one BIMEVOX compound derivative.

9. The process according to claim 8, wherein the BIMEVOX compound derivative is a compound of formula (II):

$$(Bi_2O_2)(V_{1-y}M'_yO_z) \tag{II}$$

in which M' represents a transition metal selected from the group consisting of zinc, copper, manganese, nickel, cobalt, iron and cadmium, and y is greater than or equal to approximately 0.05 and less than or equal to approximately 0.5.

10. The process according to claim 9, wherein the BIMEVOX compound derivative is $Bi_2Co_{0.1}V_{0.9}O_{5.35}$.

* * * * *